(12) United States Patent
Winkler

(10) Patent No.: US 7,798,267 B2
(45) Date of Patent: Sep. 21, 2010

(54) MOTOR VEHICLE COMPRISING A RECUPERATION GENERATOR

(75) Inventor: Josef Winkler, Kipfenberg (DE)

(73) Assignee: Audi AG, Ingolstadt (DE)

( * ) Notice: Subject to any disclaimer, the term of this patent is extended or adjusted under 35 U.S.C. 154(b) by 410 days.

(21) Appl. No.: 11/665,846

(22) PCT Filed: Oct. 7, 2005

(86) PCT No.: PCT/EP2005/010793

§ 371 (c)(1),
(2), (4) Date: Apr. 20, 2007

(87) PCT Pub. No.: WO2006/045413

PCT Pub. Date: May 4, 2006

(65) Prior Publication Data

US 2008/0122409 A1    May 29, 2008

(30) Foreign Application Priority Data

Oct. 22, 2004    (DE) .................. 10 2004 051 530

(51) Int. Cl.
*B60W 10/08* (2006.01)
(52) U.S. Cl. .................. 180/65.285; 180/65.31; 903/906; 318/140
(58) Field of Classification Search .......... 180/65.21, 180/65.265, 65.275, 65.285, 65.31; 903/907, 903/942, 906; 318/140, 151, 153, 154
See application file for complete search history.

(56) References Cited

U.S. PATENT DOCUMENTS

| | | | | | |
|---|---|---|---|---|---|
| 5,469,816 | A | * | 11/1995 | Murakawa et al. | 123/2 |
| 5,847,520 | A | * | 12/1998 | Theurillat et al. | 318/139 |
| 5,865,263 | A | * | 2/1999 | Yamaguchi et al. | 180/65.235 |
| 5,899,286 | A | * | 5/1999 | Yamaguchi | 180/65.21 |
| 6,900,554 | B1 | * | 5/2005 | Winkler | 307/10.1 |
| 7,091,626 | B2 | * | 8/2006 | Bluemel et al. | 290/40 C |
| 7,098,556 | B2 | * | 8/2006 | Kawai et al. | 307/46 |

FOREIGN PATENT DOCUMENTS

| | | |
|---|---|---|
| DE | 44 30 670 A1 | 3/1995 |
| DE | 103 16 056 A1 | 11/2003 |
| WO | WO 02/25794 | 3/2002 |

OTHER PUBLICATIONS

Nitta Tomoaki, Inventor, Decelerating Energy Regenerative System for Vehicle, Oct. 13, 1995; pp. 45-50; Patent Abstract of Japan.

* cited by examiner

*Primary Examiner*—Paul N Dickson
*Assistant Examiner*—John D Walters
(74) *Attorney, Agent, or Firm*—Novak Druce + Quigg LLP

(57) ABSTRACT

Disclosed is a motor vehicle comprising a generator and at least one capacitor in which recuperation power generated in a thrust phase by the generator that can be operated as a recuperator can be stored. The excitation current ($I_{Err}$) that limits the power of the generator (3) can be varied in the excitation circuit of the generator (3) in accordance with at least one vehicle-specific operational parameter and/or the actual charge of the capacitor (10).

13 Claims, 3 Drawing Sheets

MOTOR VEHICLE COMPRISING A RECUPERATION GENERATOR

Figure 1:
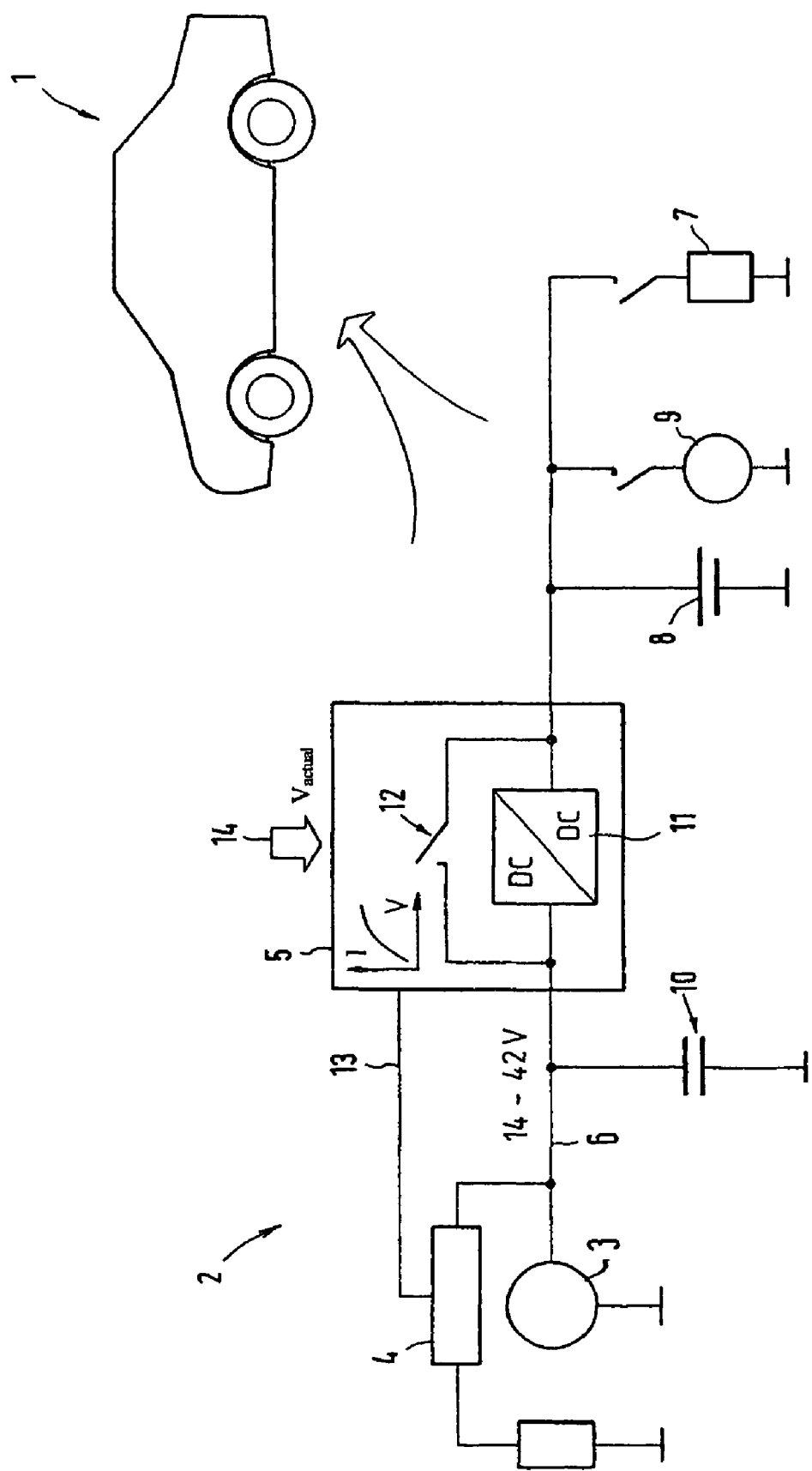

This application is a U.S. National Phase under 35 USC §371 of PCT/EP2005/010793, filed Oct. 7, 2005, which claims priority from DE 102004051530.1, filed Oct. 22, 2004, each of which is hereby incorporated by reference in its entirety.

The invention relates to a motor vehicle comprising a generator and at least one capacitor in which the recuperation energy produced by a generator which can be operated as a recuperator in the coasting phase of the motor vehicle can be stored.

For reasons of fuel economy, the attempt is made to use the kinetic energy of the motor vehicle especially in coasting phases, when fuel is not being injected and the engine is not being actively operated, to temporarily store it converted as electrical energy in an electrical energy storage device and to make it available again in the subsequent acceleration or driving phases. By preference the energy storage device is a capacitor in which on the one hand the energy is very rapidly stored, on the other hand it can also be retrieved very quickly. Based on this amount of energy which can be taken from the capacitor, it is possible to relieve the generator which in the acceleration or driving phase assumes current generation for supply of the vehicle electrical system, since the generator need not itself make available the amount of energy which can be withdrawn on the capacitor side, which ultimately fuel results in fuel savings. A generator which is suited for recuperation is preferably an electrically excited claw-pole generator. In recuperation operation, that is, in the coasting phase, the setpoint for the generator voltage is increased to the maximum value which generally corresponds to the allowable capacitor voltage, i.e., the capacitor charging voltage which can be tapped on the generator is maximum. At the same time the generator is fully excited, i.e., the excitation current in the excitation circuit of the generator is likewise maximum. As a result the generator output rises sharply, the capacitor is charged. Since the generator in recuperation operation is likewise driven via the internal combustion engine, it also constitutes an active load in this case, via which the motor vehicle is braked. Since the coasting phases, when the accelerator is released and not actuated, are generally very short, the attempt is made to store as much energy in the capacitor in as short a time as possible. This is achieved by the choice of a correspondingly powerful generator. The possible recuperation output, that is to say, the generator output, is dependent on the rpm here. With increasing rpm the generator output rises, depending on the design of the generator at higher rpm it possibly reaches a peak. The available kinetic energy which can be recovered via the generator is thus dependent on the speed.

In addition to the dependency of the recuperation power on the rpm and the driving speed, the recuperation power is also dependent on the charging state of the capacitor at the time since the possible generator output is dependent on voltage. The generator voltage is matched to the capacitor voltage, i.e., at a high capacitor voltage, if then the capacitor is already partially or relatively highly charged, on the generator a high generator voltage is tapped, thus the recuperation power is high. At a low capacitor voltage and low generator voltage, low power is used. In the case of recuperation the capacitor voltage at the time is established on the generator; it gradually rises with the charging current according to $U = I*t/C$. With increasing voltage thus also the recuperation power increases according to $P = U*I$, i.e., the active load increases, resulting in the vehicle decelerating more.

As described, the generator in recuperation operation constitutes a load which is also responsible for the vehicle deceleration which occurs in coasting operation. Since as described the attempt is made to store as much energy as possible in the short coasting phases and since powerful generators are used, high recuperation power is used, resulting also in high recuperation braking power of the generator. This high resulting braking power however at low speeds, if the kinetic energy of the vehicle is low, leads to an unpleasant, strong deceleration of the vehicle, a so-called sudden load change. The motor vehicle is decelerated relatively abruptly; this is perceived as unpleasant by many drivers.

The object of the invention is thus to devise a motor vehicle in which overly dramatic deceleration of the motor vehicle which is perceived as unpleasant in recuperation operation can be reduced or avoided.

To achieve this object, in a motor vehicle of the initially named type provision is made according to the invention so that the excitation current which limits the generator output in the excitation circuit of the generator can be varied depending on at least one vehicle-specific operating parameter and/or the instantaneous charging state of the capacitor.

In the motor vehicle according to the invention the generator output is matched to the current driving situation via control of the excitation current of the generator.

Excitation current control can be exercised depending on at least one vehicle-specific operating parameter, whereby this operating parameter can be the instantaneous actual driving speed which can be sent to the control device which controls current adjustment via any speed detection means. At high speeds sufficient kinetic energy is available. Here, with full power, that is, with maximum excitation current, recuperation is possible since based on the high, given kinetic energy, the generator-side braking power which more or less opposes it can be almost ignored, and as consequently a resulting minimum, hardly perceptible deceleration occurs. At low speed, where the strong unpleasant deceleration occurs in the prior art, according to the invention the generator output is reduced by limiting the excitation current, i.e., the active load which is responsible for deceleration and which has been formed by the generator is cancelled so that unpleasant deceleration does not occur. Therefore braking is less dramatic via the generator at low speed.

A second control parameter according to the invention is the instantaneous charging state of the capacitor. When the capacitor is discharged, as described a low generator voltage is established, and the generator works with low output. The braking action in this case is very low, the excitation current can be raised here or in general not be limited, without causing an unpleasant deceleration. As the charging of the capacitor increases, the excitation current is limited or reduced as a result of the generator output which rises depending on the voltage in order to restore the braking action. In this connection, voltage-dependent excitation current limitation should preferably only take effect when driving is at low speed, since here it also holds that at high kinetic energy, that is, when driving fast, excitation current limitation is generally not necessary since due to the high kinetic energy an unpleasant deceleration does not occur.

It is possible to implement excitation current control either depending on the vehicle-specific operating parameter, that is, for example the actual driving speed, or the instantaneous charging state of the capacitor. In addition it is also conceivable to take into account both quantities for control.

The excitation current can be changeable incrementally or linearly according to the invention. For an incremental change of the excitation current, in the control device for example discrete steps are defined, for example at 100%, 70%, 50%, 30% excitation current, which depending the actually detected control parameters, that is, for example the actual driving speed or charging state, are selected accordingly and the corresponding setpoint which can be set on the generator controller is output. Alternatively a linear change is also conceivable, preferably for digital current controllers which are connected to the control device via a corresponding interface and which acquire the corresponding setpoint, which indicates how high the excitation current may be, already defined.

For incrementally changing the excitation current in a control device which controls the change of the excitation current, at least one operating parameter or charging state setpoint can be stored, a change of the excitation current only occurring when the operating parameter or the charging state detected via the capacitor voltage exceeds or falls below the setpoint. If for example the actual speed is the corresponding control parameter, it can be defined on the control device side that in general an excitation current reduction is only possible when the actual speed is less than or equal to a setpoint of, for example, 80 km/h. At higher speeds, as a result of the high kinetic energy as described, current control is not necessary. If therefore the actual speed distinguishes the setpoint, the excitation current is reduced incrementally or linearly. If several such setpoints are given, for example 80 km/h, 60 km/h, 40 km/h, 20 km/h, to which discrete reduction steps are assigned, as the vehicle increasingly slows down, correction proceeds continuously from step to step. Likewise, conversely correction is possible when the motor vehicle in the coasting phase is for example accelerating; this can be the case when driving downhill. If in this connection a lower speed setpoint step, for example 60 km/h, is exceeded as a result of acceleration, the excitation current is increased to the next higher step since a higher excitation current can be used due to the higher kinetic energy.

Accordingly setpoints referenced to the charging state can be used, in this case preferably voltage values relating to the capacitor voltage being stored as setpoints. The charging state can be detected via the tapped instantaneous actual capacitor voltage for which the control device acquires the recorded values for the capacitor voltage in the corresponding manner.

For the linear change of the excitation current in the control device, in the latter according to the invention at least one speed-referenced or charging state-referenced control characteristic can be stored, using which the control device in conjunction with the respectively given actual speed or the actual charging state determines the value of the excitation current to be set, which value is sent to the excitation current controller.

In the event in which control of the excitation current takes place depending both on the actual driving speed and also the capacitor charging state, in the control device advantageously a three-dimensional map is stored, from which the control device depending on the given control parameters selects the respective excitation current value to be set and sends it to the current controller. In the latter the actual speed, the actual capacitor voltage (that is, the charging state) and the excitation current are plotted along the three axes. Via the ignition map optionally also speed-referenced prioritization can take place to avoid opposing effects which occur for example when at very low speed and for a completely discharged capacitor due to voltage-dependent control a higher excitation current would be allowable, but a low excitation current will be used depending on the speed, in order to have less deceleration at low speed.

Other advantages, features and details of the invention will become apparent from the embodiment described below and using the drawings.

Figure 2:
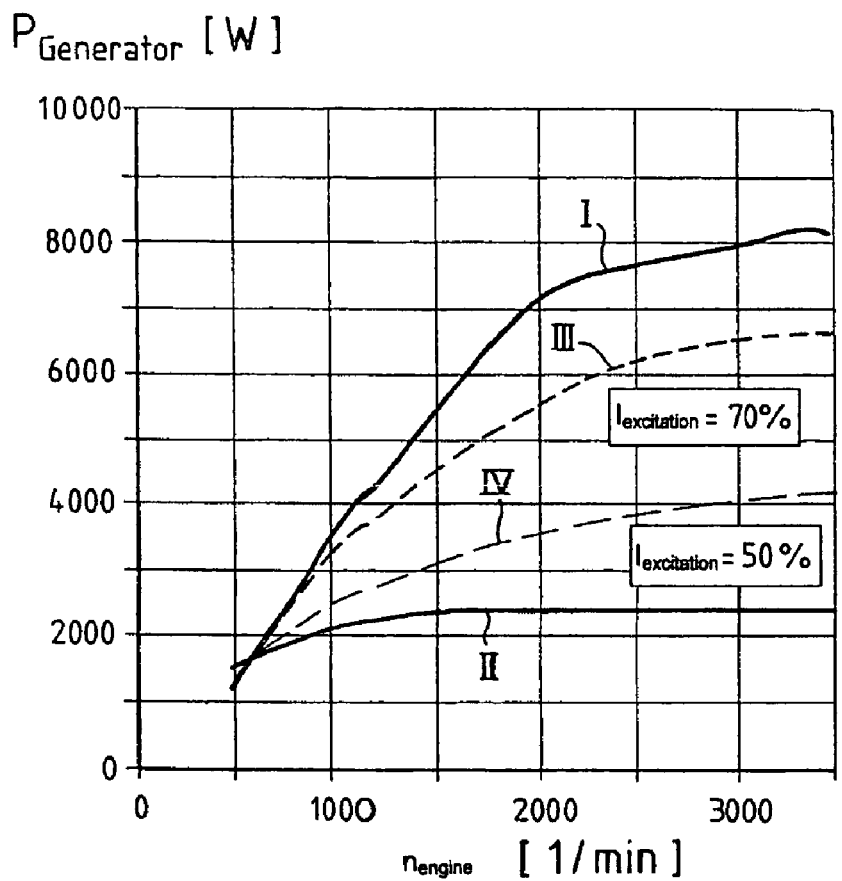
Figure 3:
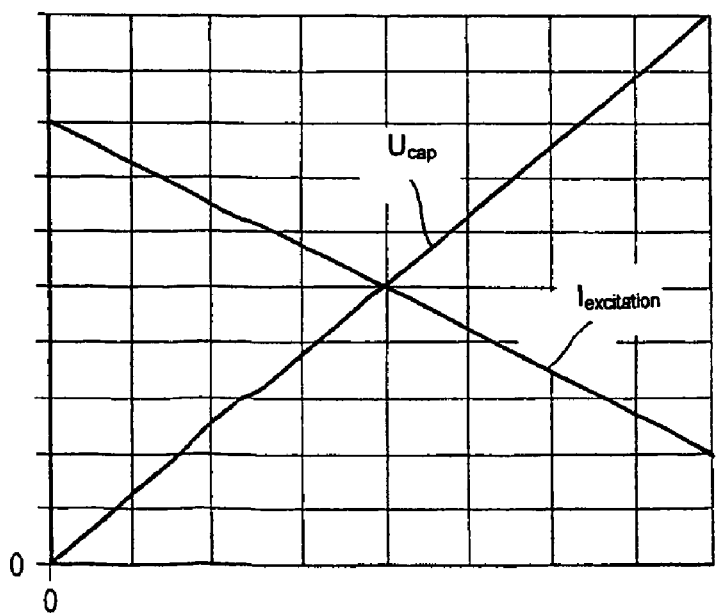
Figure 4:
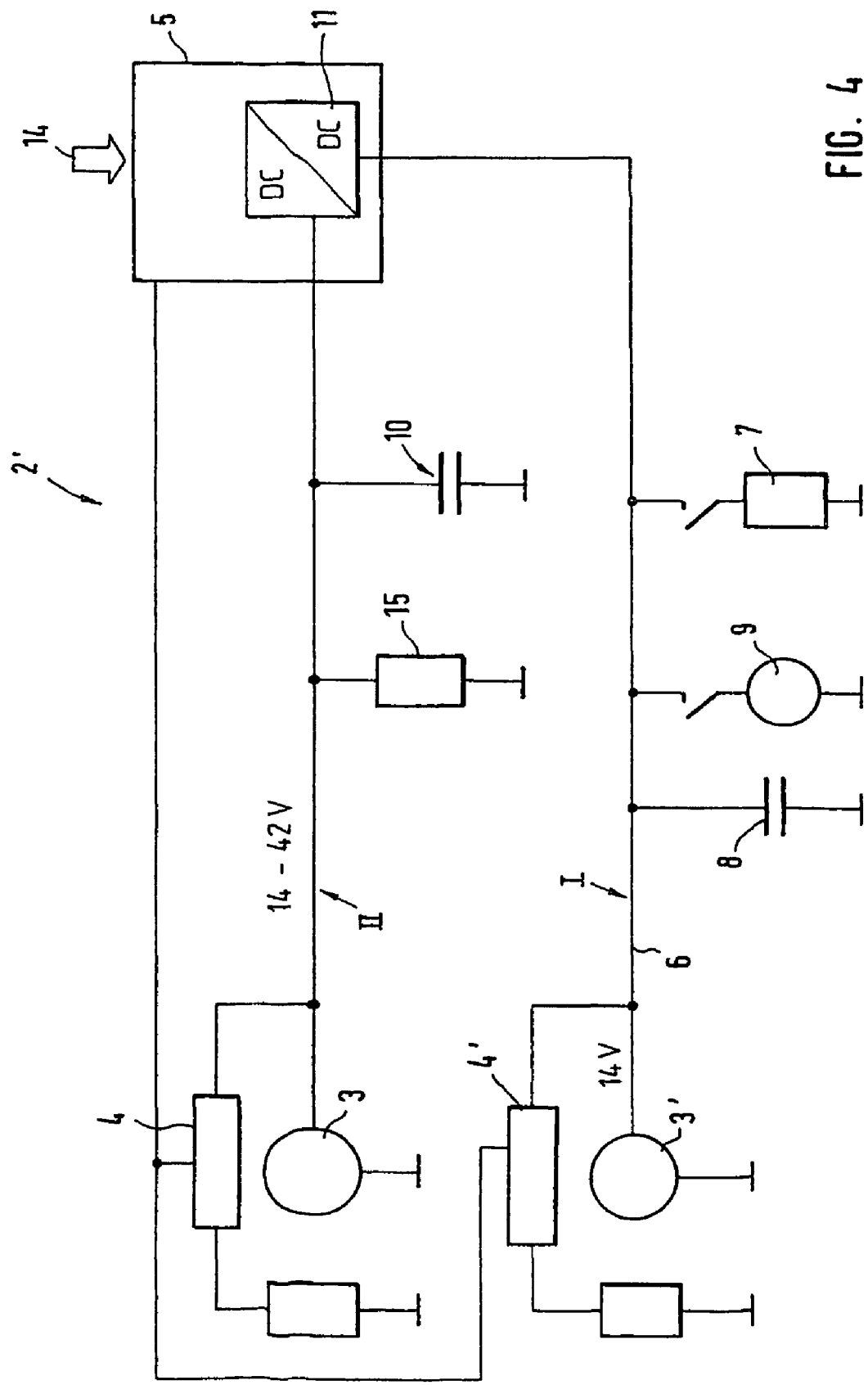

FIG. 1 shows a motor vehicle according to the invention with an extracted schematic of the vehicle electrical system of the first embodiment, FIG. 2 shows a diagram for illustration of the generator output depending on the engine rpm for various power stages with or without the excitation current limitation, FIG. 3 shows a diagram illustrating the ratio of the capacitor voltage to the excitation current, and FIG. 4 shows another vehicle electrical system for a motor vehicle according to the invention with two generators.

FIG. 1 shows a motor vehicle 1 according to the invention with a vehicle electrical system 2 which is shown enlarged as a schematic. It comprises a generator 3 to which the controller 4 is assigned; the controller is connected to a control device 5 and according to the input by the control device 4 in the described embodiment controls the output voltage delivered by the generator 3 which can be varied in the illustrated example between 14-42 V, and controls the excitation current with which the excitation circuit of the generator 3, which is preferably a claw-pole generator, which excitation circuit is not detailed, is supplied. The output voltage is sent to a generator output line 6 on which in the illustrated example a 14 V consumer 7 which can be any consumer is located, here for reasons of clarity there being only one consumer. The generator 3 furthermore feeds the battery 8, and a starter 9 is provided to start the engine. Furthermore, a capacitor 10 is connected to the output line 6; it can be a high-power capacitor, for example of the "Supercap" type. This capacitor 10, when the vehicle 1 undergoes transition into the coasting phase, is charged via the generator 3 which is being used as a recuperator. This means that in this coasting phase as a result of recuperation, energy is obtained and temporarily stored in the capacitor 10. If the vehicle again undergoes transition into the normal driving mode, the energy stored in the capacitor 10 is removed and supplied to the vehicle electrical system. As long as energy can be taken from the capacitor 10, the generator 3 can be relieved, saving fuel.

In the control device there is a DC voltage converter 11 via which the generator voltage, if it is greater than 14 V, is reduced in order to operate the 14 V consumer. By way of a switching means 12 in the control device, when high current consumers which are not shown here are connected, the higher voltage can be transmitted to them.

In order to be able to control the controller 4 as required with respect to the excitation current variation provided according to the invention, the control device 5 is connected to the preferably digital controller 4 via a communications line 13 and a corresponding interface. Via this control line the controller receives the corresponding inputs from the control device, how high the excitation current with which the excitation circuit of the generator 3 is operated should be at the instant, the controller then sets the excitation current accordingly and varies the generator output via it. For this purpose, for example in the control device 5, a control characteristic is stored, as is shown by way of example in FIG. 1. From this control characteristic the control device 5, depending on the given actual driving speed $V_{actual}$ which is sent for example to the control device for example via the CAN bus 14, selects the corresponding current value which can be set by the controller 4. Even though in FIG. 1 only the speed-dependent excitation current control is shown, it is of course also possible to vary the excitation current as a function of the charging state of the capacitor 10. The charging state of the capacitor 10 is communicated to the control device via the instantaneous capacitor voltage. Using a comparable control characteristic, as is shown in FIG. 1, which is however then referenced to the charge or voltage, the corresponding control can then be exercised.

In order to stop or diminish the deceleration of the vehicle which is often unpleasant at low speed as a result of the generator working in recuperation, provision is made according to the invention, so that the excitation current be limited for example depending on the driving speed. As described, the generator output is limited by way of the excitation current, the output in turn being proportional to the braking or deceleration action of the generator.

FIG. 2 shows as a diagram the generator output as a function of the excitation current, from which the effective deceleration power of the generator in recuperation operation relative to the speed is apparent. The x-axis plots the engine rpm and the y-axis plots the generator output. The first curve I shows the behavior of the output over rpm at a tappable generator voltage between 14-42 V and maximum generator excitation, that is, maximum generator current. Curve II shows the maximum output at maximum excitation current with the generator voltage limited to 14 V.

Proceeding from curve I, curve III shows the behavior of the output when the excitation current $I_{excitation}$ is reduced to 70%. Obviously the generator output decreases, compared to curve I. The increase in output with increasing rpm is much more weakly pronounced. As a result of this output decrease, a low deceleration power in recuperation operation is established.

The behavior is more distinctly pronounced when the excitation current $I_{excitation}$ is reduced to 50%, as curve IV shows. The power decrease compared to curve III is very strongly pronounced, i.e., the braking power is further reduced.

If with consideration of these relationships the actual speed $V_{actual}$ which falls below a speed threshold, for example 80 km/h, is communicated to the control device 5 in FIG. 1 via the CAN bus 14, the control device falls back on the stored characteristic and selects that excitation current value $I_{excitation}$ which should be present at maximum for excitation, if there is a transition to coasting operation. The generator is thus less strongly excited, its output and thus the effective active load are reduced, the deceleration action is less. Nonetheless the capacitor 10 is still adequately charged. With an increasing drop in speed, the control device 5 corrects the controller 4 accordingly so that the level of the excitation current is continuously matched to the actual speed and consequently the effective braking action of the generator is matched to the actual speed.

At this point it should be pointed out that excitation current control only takes effect when driving in the coasting mode. This mode can be signaled to the control device likewise via the CAN bus 14. For this purpose, for example, the engine control unit communicates that no fuel is being injected, or the accelerator position is sensed. If it is equal to zero or is negative, this is likewise communicated to the control device. Conversely, in a braking process, that is, when the brake pedal is being actuated, in general high deceleration is desired. As a result, in this case recuperation always takes place with full generator output, regardless of the speed and the capacitor charging state. This means that the maximum excitation current is always present.

FIG. 3 shows in the form of a diagram the relationship between the capacitor voltage $U_{cap}$ and the excitation current $I_{excitation}$. As described, excitation current control based on the charging state of the capacitor can proceed via its voltage. The lower the capacitor voltage, the higher the excitation current can be since the generator voltage which is required relative to the capacitor voltage, and thus the generator output, are low. In this case excitation is possible with a high or maximum excitation current. This is therefore the case since relative to the effective power demand required on the capacitor side, the entire generator output and thus braking action are low.

With increasing capacitor voltage, a higher and higher generator voltage is set on the generator, i.e., the generator works with increasingly higher output. Accordingly, the allowable excitation current decreases, as is to be seen from FIG. 3.

As described, it is possible to control the excitation current both depending on the actual speed and also the capacitor voltage. For very slow speeds optionally prioritization of the control basis can be necessary. At low speeds in speed-dependent control the excitation current can be chosen to be low. If the capacitor is fully discharged at the instant of control, control which is dependent on the capacitor voltage leads to control of an excitation current which is as high as possible. Here it is advantageous to prioritize either the speed-referenced control, or to define control which has been optimized in the respective case, that is, depending on the two control parameters present, via a correspondingly designed ignition map.

FIG. 4 shows as a schematic another embodiment of the vehicle electrical system and a circuit configuration for an energy distribution network in a motor vehicle, the same components being identified with the same reference numerals as in FIG. 1. In the vehicle electrical system 2' there is a generator 3' in addition to the controller 4', the generator 3' being assigned primarily to the voltage circuit I in which the 14 V consumer 7, the starter 9 and the battery 8 are connected. The controller 4' communicates with the control device 5 and is used for controlling the generator output voltage. The latter is sent to the generator output line 6, the generator output voltage being limited to 14 V. The voltage is distributed among the corresponding components via the line 6.

A second voltage circuit II is supplied with voltage via a separate generator 3 which is controlled in terms of and according to the invention. In this voltage circuit II for example there is a high current consumer 15, a windshield heating system. The latter requires an operating voltage of 42 V which is made available via the generator 3. If the high voltage consumer 15 is not connected, the output voltage of the generator 3 which exceeds 14 V is optionally supplied by way of the DC voltage converter 11 reduced and to the voltage circuit I.

The capacitor 10 is integrated in the voltage circuit II. Here the above described control of the excitation current takes place by way of the controller 4 which is triggered by the control device 5.

The invention claimed is:

1. Motor vehicle comprising:
    a generator; and
    at least one capacitor in which the recuperation energy produced by a generator,
    which can be operated as a recuperator in the coasting phase of the motor vehicle, can be stored,
    wherein an excitation current, which limits the output of the generator in an excitation circuit of the generator, can be limited, depending on a parameter selected from the group consisting of at least one vehicle-specific operating parameter, an instantaneous charging state of the capacitor, and combinations thereof.

2. The motor vehicle as claimed in claim 1, wherein the vehicle-specific operating parameter is an instantaneous actual driving speed.

3. The motor vehicle as claimed in claim 1, wherein the excitation current can be changeable incrementally or linearly.

4. The motor vehicle as claimed in claim 3, wherein for incrementally changing the excitation current in a control device which controls the change of the excitation current, at least one setpoint is stored, a change of the excitation current only occurring when an operating parameter or the charging state detected via the capacitor voltage exceeds or falls below a setpoint.

5. The motor vehicle as claimed in claim 3, wherein for the linear change of the excitation current in a control device, at least one speed-referenced or charging state-referenced control characteristic is stored.

6. The motor vehicle as claimed in claim 1, wherein for control of the excitation current depending both on an actual driving speed and also the capacitor charging state, a three-dimensional map is stored in the control device.

7. A method for decelerating a motor vehicle comprising:
sensing an operating parameter of the vehicle;
sending the parameter to a control device;
reducing output of a generator by limiting an excitation current therein, depending upon the sensed operation parameter.

8. The method of claim 7, wherein the operating parameter is actual driving speed.

9. The method of claim 8, wherein decreased actual driving speed results in increased reduction of the output of the generator.

10. The method of claim 7, wherein the operating parameter is an instantaneous charging state of a capacitor.

11. The method of claim 10, wherein an increased charging state of the capacitor results in increased reduction of the output of the generator.

12. A motor vehicle comprising:
a generator having an excitation circuit;
a capacitor for storing energy produced by the generator, when the motor vehicle coasts; and
a control device programmed to specify an excitation current in the excitation circuit of the generator based on a parameter selected from the group consisting of at least one vehicle-specific operating parameter, an instantaneous charging state of the capacitor, and combinations thereof,
wherein the specified excitation current is a percentage of a maximum excitation current at which the generator is fully excited.

13. The motor vehicle according to claim 12, wherein the control device is programmed to specify the excitation current at the maximum excitation current when a vehicle specific operating parameter indicates the motor vehicle is in a braking mode.

* * * * *